AUTOMATIC DISTORTION COMPENSATION IN PULSED SIGNAL TRANSMISSION

Original Filed Sept. 12, 1966

INVENTOR
GUSTAV GUANELLA
BY
KARL RATH
ATTORNEY

AUTOMATIC DISTORTION COMPENSATION IN PULSED SIGNAL TRANSMISSION

Original Filed Sept. 12, 1966 8 Sheets-Sheet 2

INVENTOR
GUSTAV GUANELLA
BY
KARL RATH
ATTORNEY

INVENTOR
GUSTAV GUANELLA
BY
KARL RATH
ATTORNEY

AUTOMATIC DISTORTION COMPENSATION IN PULSED SIGNAL TRANSMISSION

Original Filed Sept. 12, 1966 8 Sheets-Sheet 4

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

United States Patent Office 3,543,160
Patented Nov. 24, 1970

3,543,160

AUTOMATIC DISTORTION COMPENSATION IN PULSED SIGNAL TRANSMISSION

Gustav Guanella, Zurich, Switzerland, assignor to Patelhold Patentverwertungs- & Elektro-Holding AG., Glarus, Switzerland Continuation of application Ser. No. 578,847, Sept. 12, 1966. This application Nov. 12, 1969, Ser. No. 871,563
Claims priority, application Switzerland, Oct. 8, 1965, 13,912/65
Int. Cl. H04l 1/00
U.S. Cl. 325—42 15 Claims

ABSTRACT OF THE DISCLOSURE

In pulse signal transmission by means of a series of spaced signal pulses having a constant pulse spacing interval and being subject to dispersion distortion by one pulse imposing cross-distortion components upon at least two adjacent pulses leading and lagging respectively said first pulse by cross-distortion intervals equal to predetermined, including unity, multiples of said spacing interval, the sense and magnitude of both leading and lagging distortion components is determined by mutual intermodulation of a first amplitude limited pulse series derived from the received signal pulses with respective second and third pulse series also derived from said received pulses and being time-displaced, both in sense and magnitude, from said first series by intervals corresponding respectively to said cross-distortion intervals. The intermodulation product, after adequate filtering, provides an output signal proportional, in magnitude and sense, to the respective cross-distortion component and suitable for use in distortion monitoring or as a control signal for a separate distortion compensating system, to maintain an automatic distortion compensation independently of variations of the distortion characteristics of the transmission channel.

This is a continuation of application Ser. No. 578,847, filed Sept. 12, 1966 and now abandoned.

The present invention relates to pulsed signal transmission, more particularly to a method of and system for distortion or cross-talk detection and/or compensation in transmission systems of this type.

More particularly, the invention relates to the provision of means for obtaining a monitoring or sensing signal or magnitude representative of the cross-distortion of the instantaneous values of a first pulse signal caused by the instantaneous values of a second pulse signal displaced in time by a definite amount in respect to said first-named instantaneous values.

The currents or voltages used in modern communications engineering frequently are in the form of intermittent signals or impulses, the term "pulse" being used hereinafter for such signals for the purpose of this specification, irrespective of any definite shape or form thereof.

A more specific object of the invention is the utilization and provision of a cross-talk or distortion monitoring or sensing device with means to automatically adjust suitable distortion correcting devices, to maintain full or optimum distortion compensation substantially independently of fluctuations or variations of the amount or extent of the distortions obtaining in a transmission channel during signal transmission.

During transmission over existing communications channels, electrical pulse signals ordinarily suffer unavoidable cross-distortion which makes it difficult or impossible to identify the signals at the output or receiving end of a channel. For example, originally steep and narrow pulses may be distorted or deformed by the addition thereto of a number of instantaneous leading and/or trailing distorting pulses or signal values. If subjected to additional deformation being opposite to the distortion or deformation caused by the transmitting channel, the signals can be restored to pulses of a similar or identical shape to those originally applied at the transmitting end of the channel, i.e., the original deformation or distortion may be compensated by the reversed deformation produced by means of a suitable distortion compensating device. In order to effect such a distortion compensation, it is generally sufficient to derive a few time-sequential instantaneous signal amplitudes or values from the distorted pulses, without any regard to the overall pulse shape or curve.

The foregoing type of distortion compensation is not new and there are various known processes of and devices for compensating or correcting the distortions imparted to electrical signal pulses during transmission over a communications channel or link. Devices of this type are described, for instance, in the present applicant's copending application Ser. No. 529,434 filed Feb. 23, 1966, entitled Distortion Compensating System for Use in Pulsed Signal Transmission, now Pat. No. 3,381,245, issued Apr. 30, 1968.

In the known systems, the original pulse shape is restored or corrected in the manner set forth by the distorted signal being passed through distortion correcting elements which produce an effect opposed to the original distortions. Alternatively, the signal pulses may be predistorted before transmission in such a manner as to utilize the distortion effect of the transmission channel for the removal or correction of the distortion.

The known correcting devices, such as described in the above-mentioned patent, comprise a plurality of adjustable elements for correcting the distortions of a given pulse deriving from different adjoining lagging and/or leading pulses which elements must be regulated and set before transmission in accordance with the prevailing distortion characteristics of the transmission channel, the direction of transmission of the correcting currents or voltages being reversed if necessary.

It has been found that cross-distortion by a transmission channel is generally not constant but may fluctuate considerably, with the result that the adjustable correcting elements have to be reset frequently in order to maintain optimum distortion compensation. This in turn requires the employment of technically skilled personnel, with the plant or channel remaining idle during the readjustment of the correcting devices.

This has raised the problem of providing a method of or means for continuously automatically readjusting the distortion correcting devices by the production of a distortion sensing or correcting signal or magnitude representative of the sense and amount of distortion and suitable for the automatic control of the adjusting elements in response to any existing or residual distortion or cross-talk which may be corrected by a normal distortion compensating device.

Various proposals have been put forward for the solution of the foregoing problem.

According to one known process, an auxiliary pulse train in one pulse channel of a time-multiplex pulse transmission system is modulated by a sinusoidal tone the amplitude of which is detected in a neighboring channel. The distortion-correcting signals in each individual channel are then mixed with the sinusoidally modulated pulse train in a product-forming device associated with each of the channels, the quantity appearing in the output of said device being a measure of the value of the cross-distortion or cross-talk between the individual channels of the multiplex system and suitable for utilization as a sensing or correcting signal for the control of the distortion correcting element or elements, to reduce the sensing or correcting signals and, in turn, the distortion to a minimum.

In other words, according to the foregoing process, the average product is formed of the auxiliary pulse train passing through one channel and the cross-talk signal produced in the other channel, said product being utilized for the automatic regulation of the distortion correcting elements or devices of the distortion compensator proper. This process has the disadvantage that a full channel of the multiplex system must be reserved for the transmission of the monitoring tone or signal.

According to another known process, only single pulses separated by relatively long intervals are transmitted for the purpose of monitoring the cross-talk or distortion. The resultant residual signals occurring between the main pulses are then a direct measure of the cross-talk or distortion and may be utilized for the automatic adjustment of a distortion correcting element. A serious disadvantage of this process is the fact that it cannot be carried out simultaneously with the desired transmission and is thus not suited for continuous and automatic distortion supervision and/or control.

According to still another process, the average product is formed of an undelayed pulse train and a pulse train delayed therefrom by a definite amount or interval, to provide a signal proportional to the distortion or cross-talk at any given time and suitable for the adjustment or setting of the associated correcting elements. The disadvantage of this process is that it does not enable any distinction to be made between leading and trailing distortion, that is distortion of the trailing edge of a pulse caused by a succeeding pulse, and distortion of the leading edge of the pulse caused by a preceding (trailing of lengthened) pulse of a series, respectively. As a consequence, this process and system can be used only in connection with transmission channels exhibiting a single type such as trailing distortion only. In other words, if $h_k$ denotes the cross-talk value of the trailing distortion and $h_{-k}$ denotes the cross-talk value of the leading distortion, theoretical analysis and calculation show that the final correlation product or distortion monitoring signal $u_k$ is represented by the formula $$u_k=k(\ldots+h_{-k}\ldots+h_k+\ldots)$$

The correlation product $u_k$ thus corresponds approximately to the sum of the cross-talk values $h_k$ and $h_{-k}$ of each signal pulse on the pulses following or preceding it by $k$ steps. Since it is impossible to separate the two cross-talk values, this process is suited only for such cases practically involving trailing distortion exclusively because $h_{-k}$ then disappears in the product.

An important object, therefore, of the present invention is to overcome the foregoing and related disadvantages and shortcoming of known cross-distortion monitoring and control systems by the provision of improved apparatus for the generation of a cross-talk monitoring or sensing signal or signals individually representative of both the leading and trailing distortions of a pulse signal and suitable for the carrying into effect of an automatic and reliable distortion compensation involving both leading and trailing distortion and deriving from both the immediately adjacent (first order cross-talk), as well as further removed pulses (second, third, etc. order cross-talk) of said signal.

The invention, being appropriately characterized as polarity-reversing process, will be better understood, both as to the foregoing and ancillary objects, as well novel aspects thereof, from the following detailed description, taken in conjunction with the accompanying drawings forming part of this specification and in which.

Figure 3A:
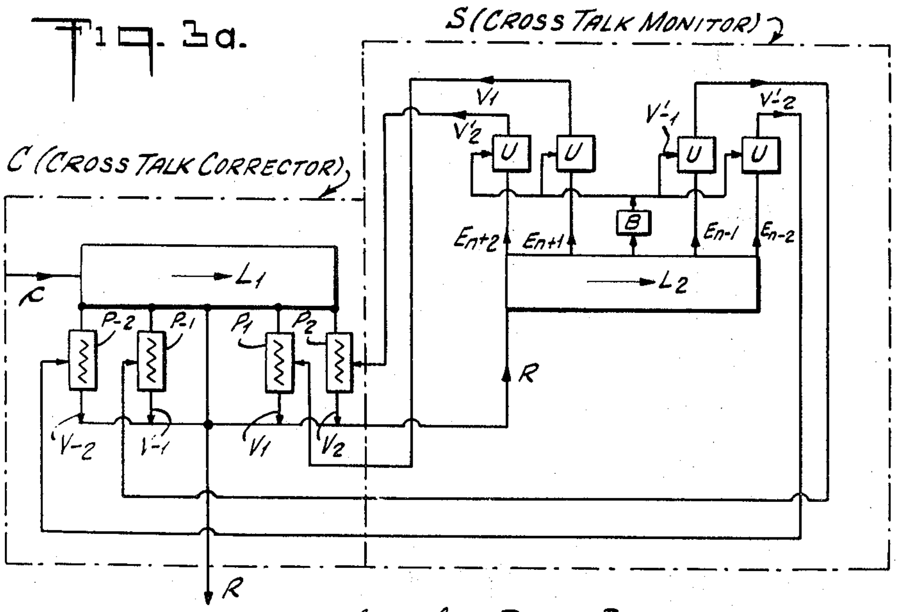
Figure 3B:
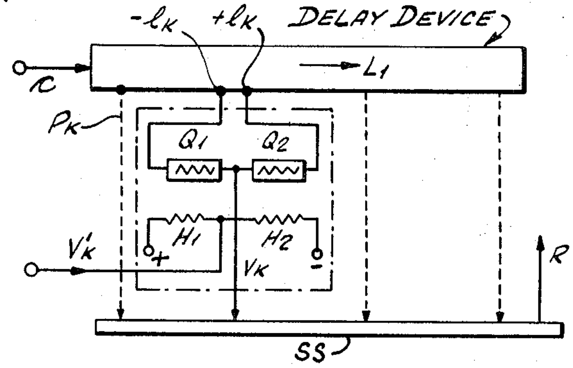
Figure 4:
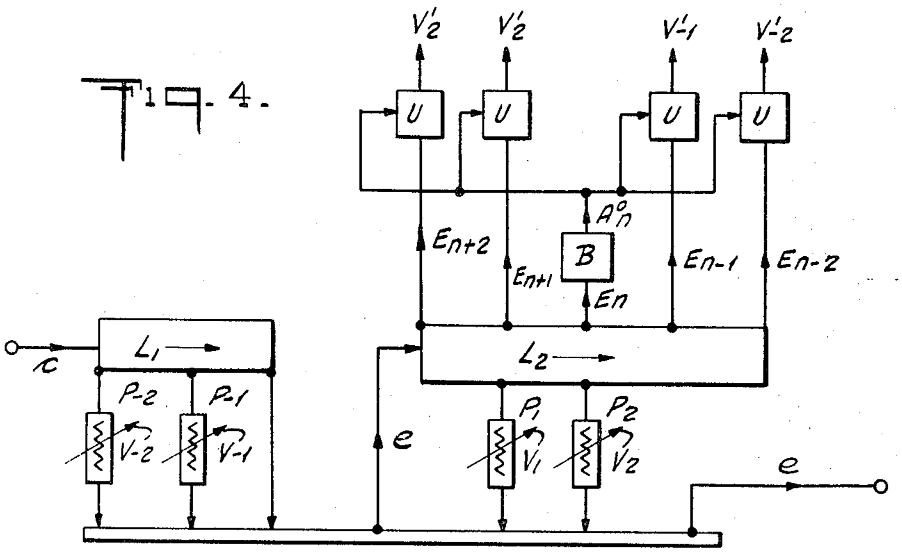
Figure 5:
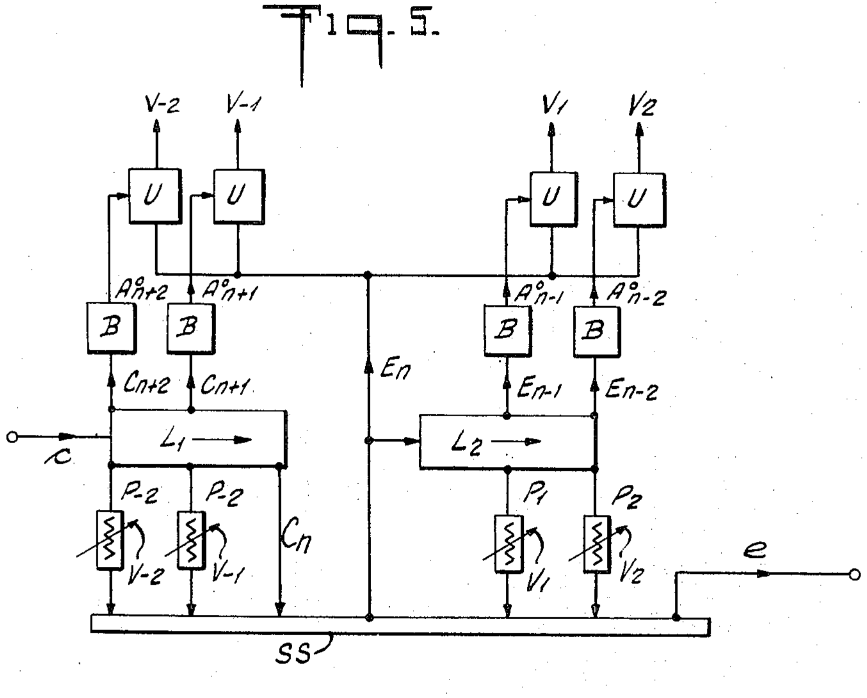
Figure 6:
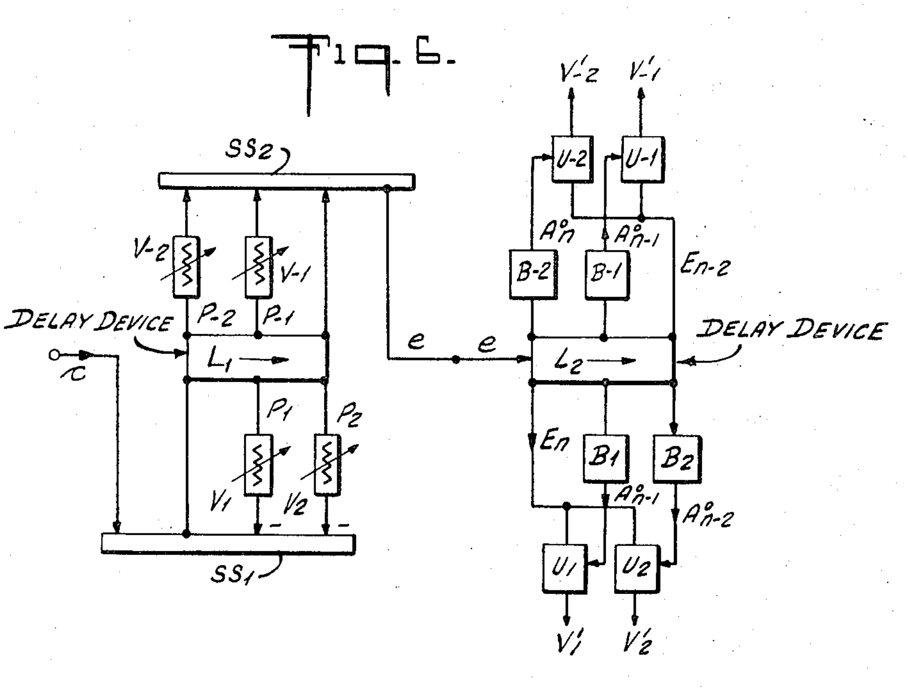
Figure 6A:
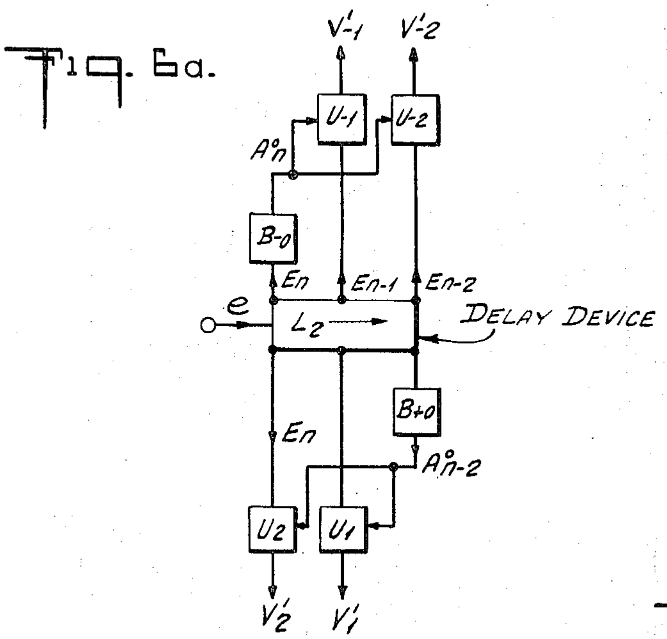
Figure 6B:
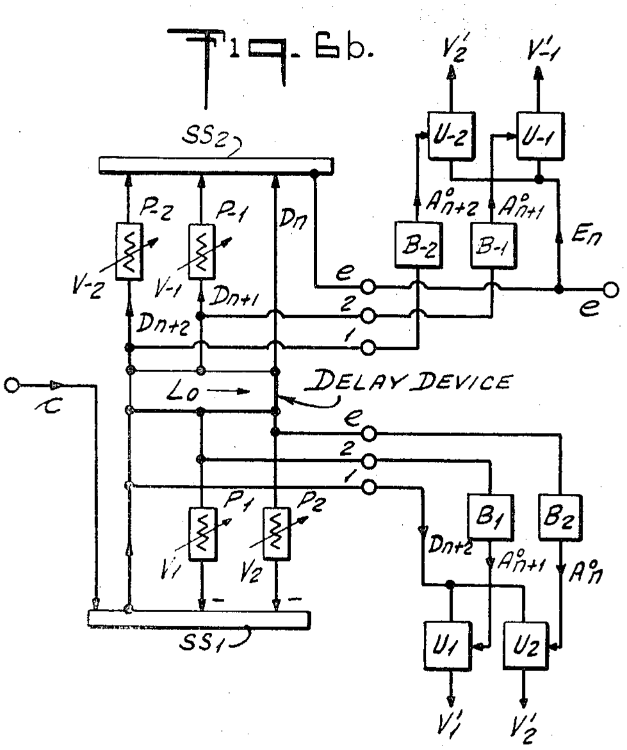
Figure 6C:
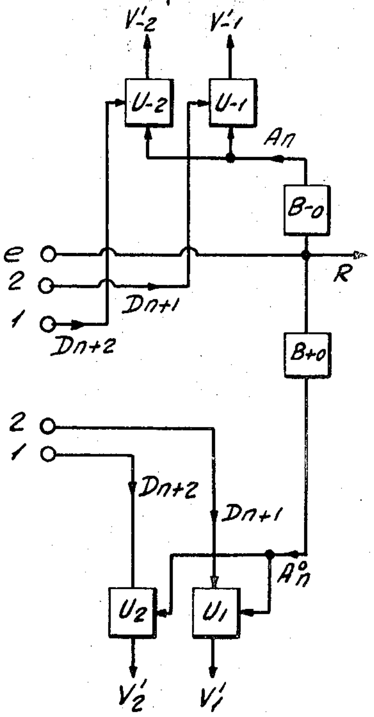
Figure 7:
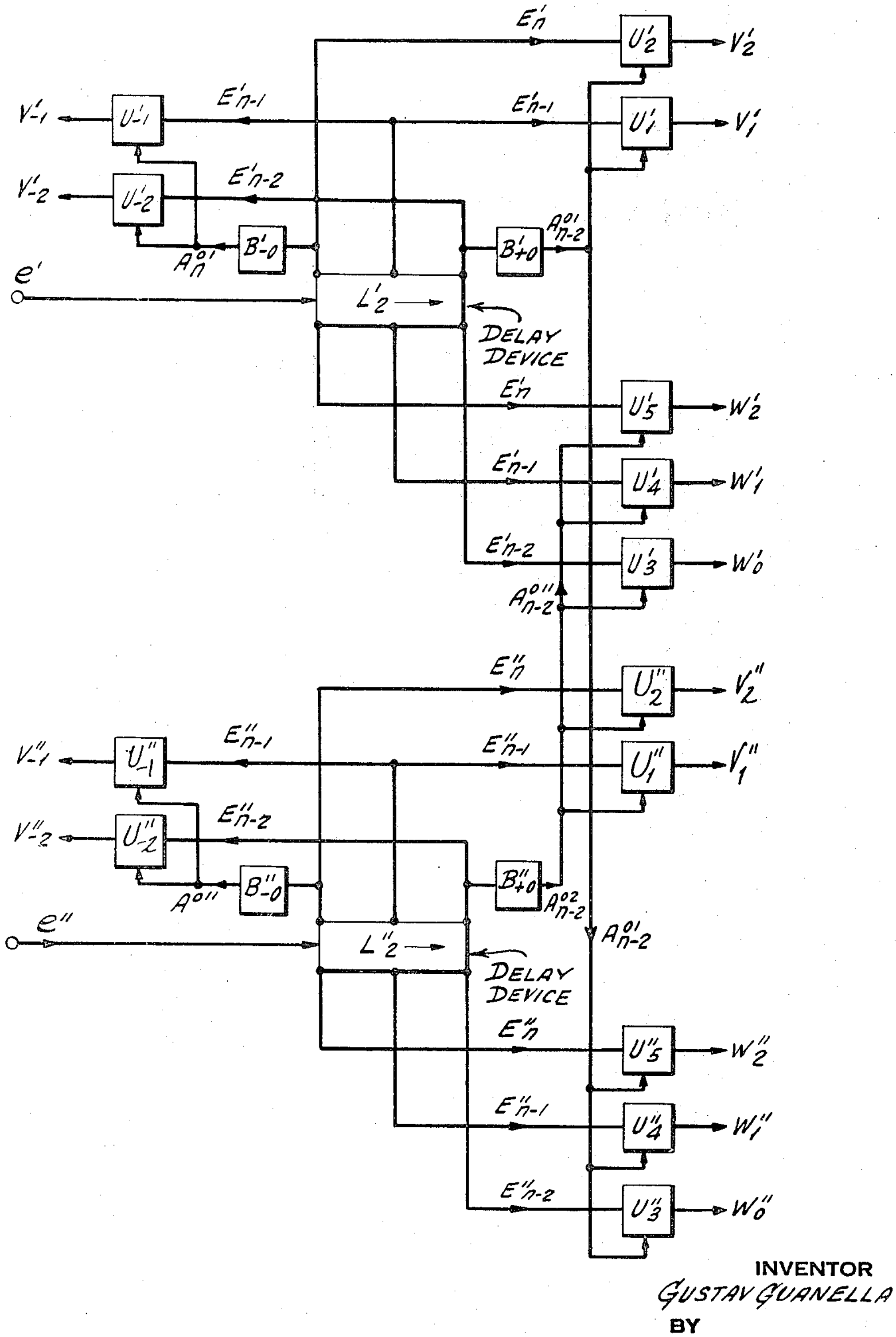
Figure 8:
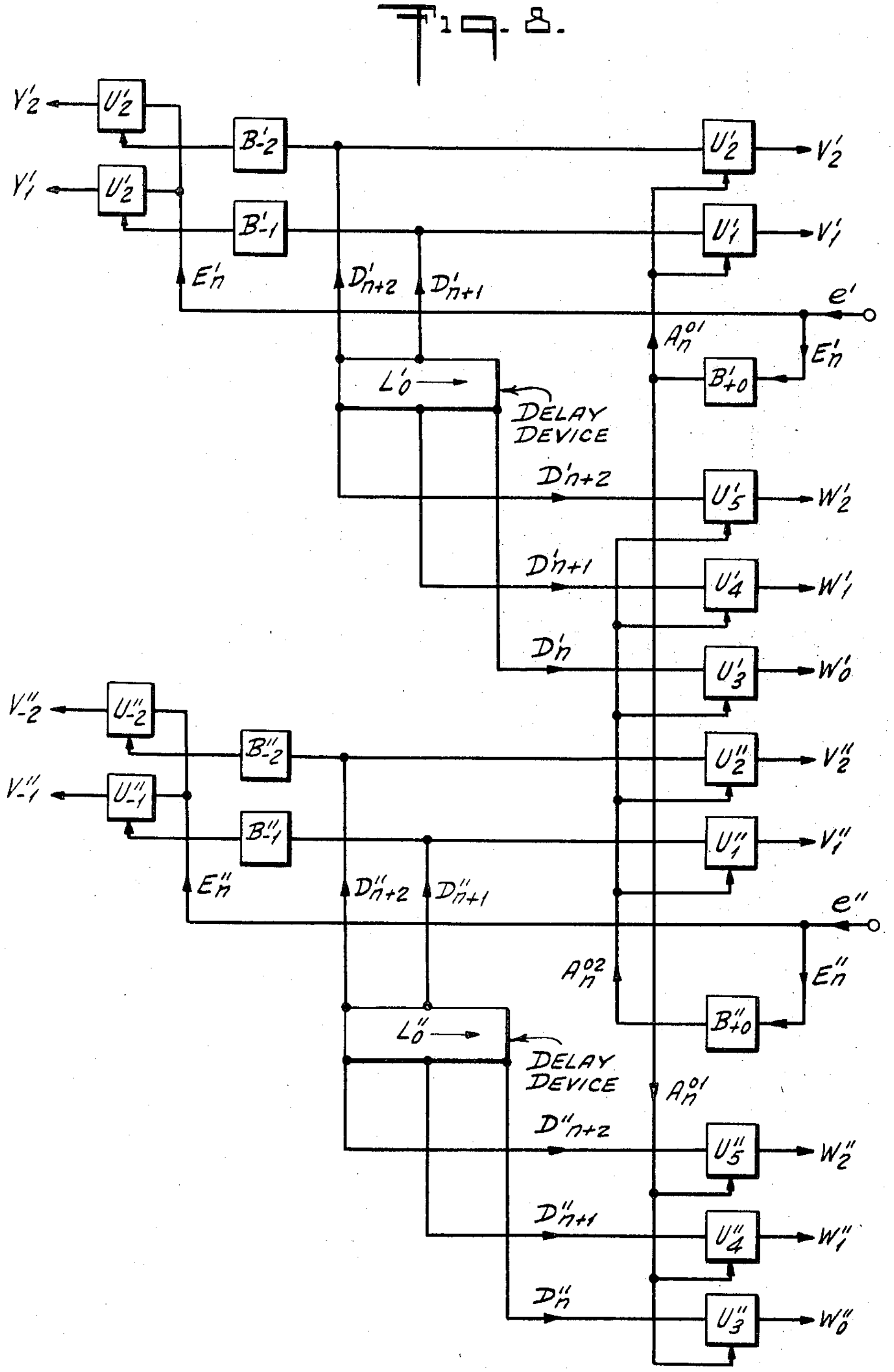
Figure 9:
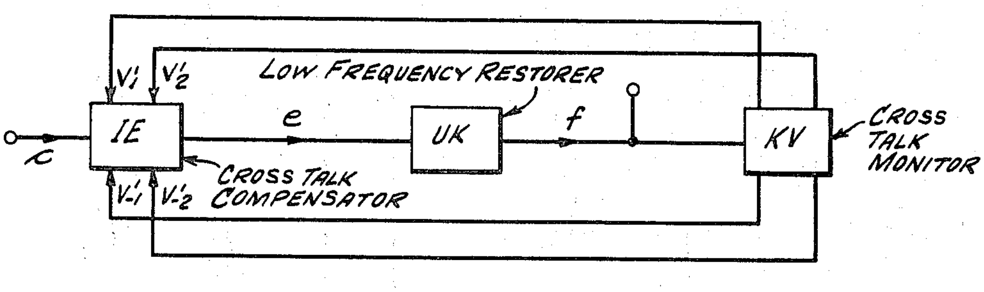
Figure 10:
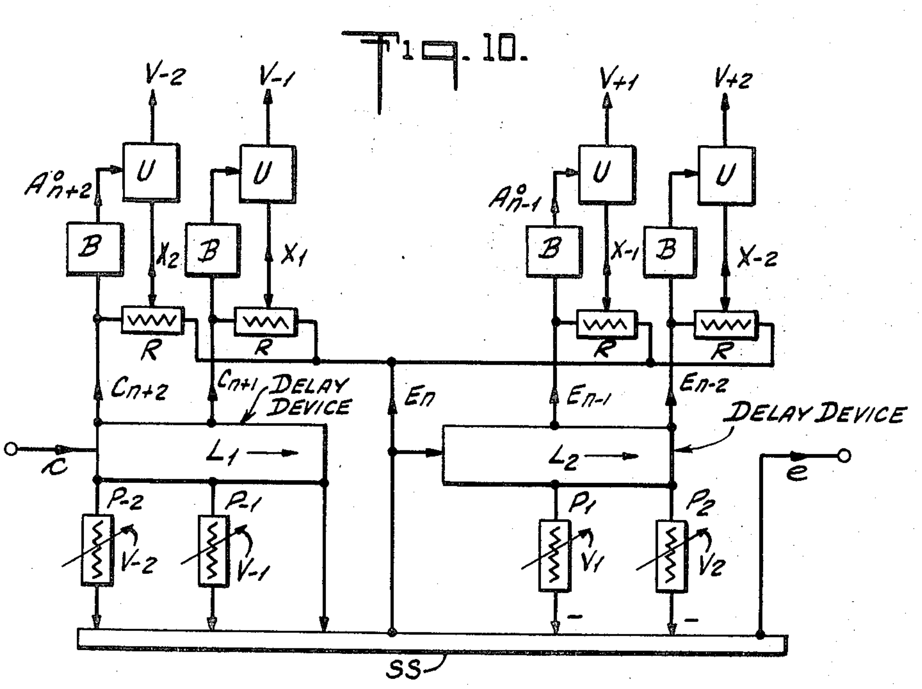
Figure 11:
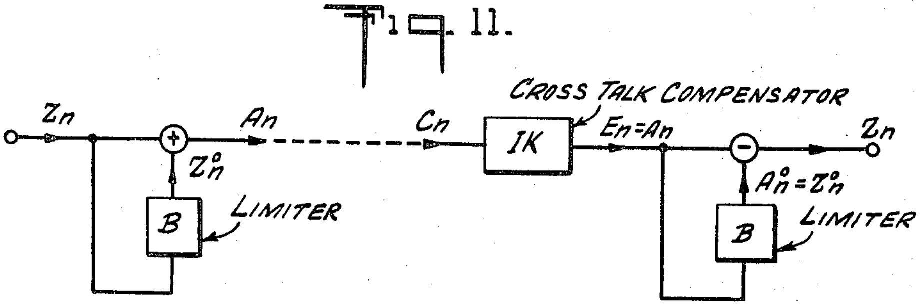
Figure 12:
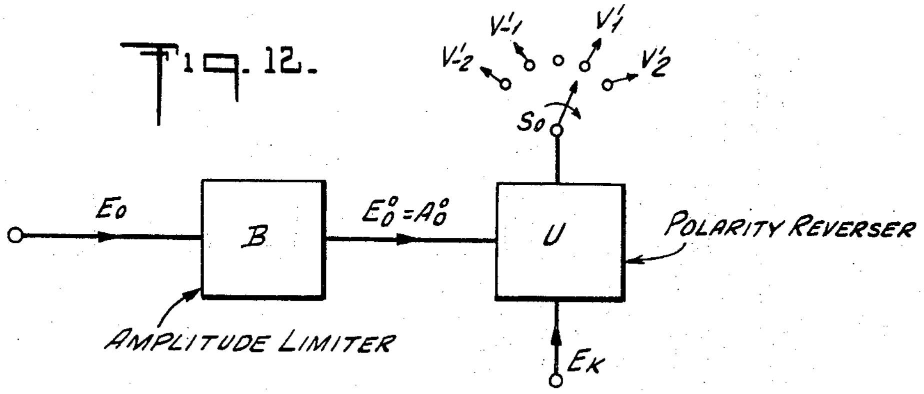
Figure 13:
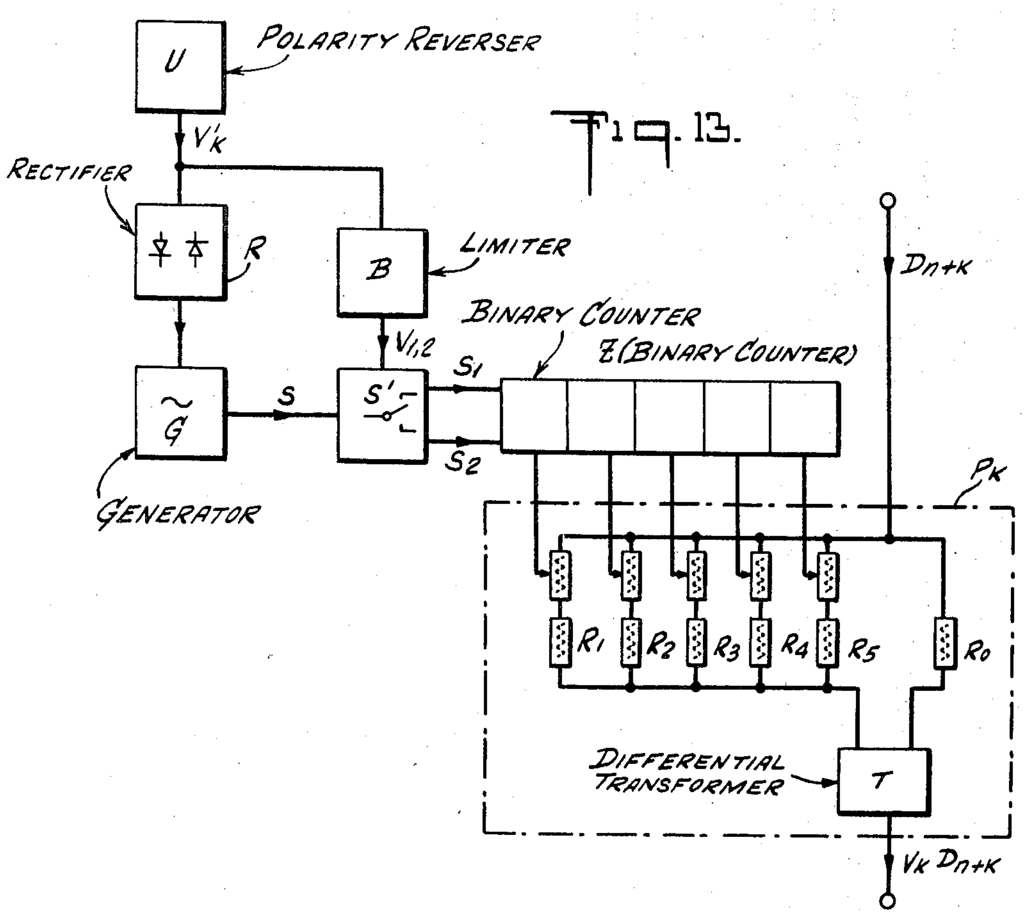

FIG. 3*a* shows in more elaborate and block diagram form a complete automatic distortion compensation system according to the invention;

FIG. 3*b* is a block diagram of an automatic distortion correcting element suitable for use in FIG. 3*a*;

FIG. 4 is a diagram similar to FIG. 3*a* with one of the delay devices combinedly utilized for both distortion compensation and/or monitoring;

FIG. 5 illustrates a modification of FIG. 4;

FIGS. 6 and 6*a* show, respectively, first and second modifications of FIG. 3*a*;

FIGS. 6*b* and 6*c* show modifications of FIG. 6;

FIG. 7 is a block diagram of an arrangement for obtaining cross-talk correcting or sensing magnitudes according to the invention for the monitoring and/or compensation of pulse distortion caused by mutual coupling between two transmission channels;

FIG. 8 is a block diagram showing a modification of FIG. 7;

FIG. 9 is a block diagram of a distortion correction system according to the invention embodying means to restore low frequencies or direct-current components of the sensing signals which have been suppressed by the transmission channel;

FIG. 10 is a block diagram of an arrangement for the monitoring of cross-talk without previous restoration of the suppressed low frequencies;

FIG. 11 is a block diagram of a transmitting system embodying means to raise the amplitude of all the pulses by a constant amount at the transmitting end;

FIG. 12 is a block diagram of an arrangement according to the invention with the monitoring signal producing (polarity-reversing) device being controlled by an undelayed transmitted signal pulse, and FIG. 13 is a block diagram of a correcting device to control a cross-talk correcting signal, comprising a plurality of adjustable resistors controlled by a pulse counting device.

Like reference characters denote like parts throughout the different views of the drawings.

With the foregoing object in view, the present invention involves generally the provision of an improved system and method for the generation of a distortion or cross-talk sensing or monitoring signal or voltage, that is, a signal varying in both sense and magnitude in proportion to the cross-talk distortion factor of a first signal pulse, or an instantaneous amplitude value such as the leading edge of such pulse, caused by a following (leading distortion) or a preceding (trailing distortion) second signal pulse, or second instantaneous amplitude value thereof, said second value being displaced from said first signal value by a fixed interval which may be equal to one or more steps or pulse intervals.

Assuming, for instance, the second pulse to be lagging said first pulse and to have a 50% trailing cross-distortion factor $v_k$ acting on the first pulse, then $v_k=v_1=+0.5$, wherein the index 1 denotes the displacement between the pulses to be one step or pulse interval. In other words, 50% of the value of the second pulse is imposed upon the first pulse in the form of cross-distortion. Similarly, if the trailing or delay distortion on a third pulse leading said first pulse is equal to say $v_2=-0.2$, 20% of the value of the second pulse will be subtracted from said third pulse. The foregoing applies to so-called trailing distortion being caused by the lengthening of the trailing edges of the pulses in a train or series. In the case of leading distortion, caused by the broadening or lengthening of the leading pulse edges, a leading distortion of say 30% on a fourth pulse preceding said second pulse will result in a distortion factor $v_{-1}=+0.3$. In accordance with this terminology, the plus sign of the index of $v_k$ denotes trailing distortion and the minus sign of the index denotes leading distortion, while the sign of $v_k$ itself denotes either a positive or negative distortion factor or an increase or decrease, respectively, of the instantaneous values concerned.

In practice both said first and second signal pulses, forming part of a continuous pulse train or series and utilized in accordance with the invention for the generation of the crosstalk sensing or monitoring signal, contain distortions and, according to the underlying inventive concept, one of the instantaneous signal values is limited by means of a suitable amplitude limiting device or circuit, to produce constant amplitude control signals of preferably unity amplitude. The limited signals or control pulses are then mutually intermodulated with the other instantaneous pulse value in a product-forming device or modulator or circuit, to produce an intermodulation product or output constituting a signal $v_k'$ which varies both in sign and magnitude in proportion to the variations of the respective cross-talk factor $v_k$ and represents a cross-talk monitoring or sensing signal or voltage. The signal $v_k$ may be utilized for simple cross-talk monitoring purposes by energizing a suitable indicator or measuring instrument, or for effecting an automatic cross-talk compensation by controlling the corresponding correcting element of a preceding distortion compensator, such as of the type as shown in the above-mentioned co-pending application. If the unity control pulses follow each other at the rhythm of the signal pulses of the series, suitable smoothing means are connected to the output of the modulator, to result in a monitoring signal $v_k'$ closely following the variations of the cross-talk characteristics of the distorting transmission channel. The modulator acting as a polarity-reversing device is preferably of the balanced type and excited through a pair of transformers or the like, to eliminate the direct current component in the output signal $v_k'$ which then varies, both in sense and magnitude, in accordance with the fluctuations only of the cross-talk characteristics of the transmission channel, or residual cross-talk factor of the signals in the output of the main cross-talk compensator.

If the monitoring and/or control of more than one cross-talk factors ($v_1, v_2, v_{-1}$ . . . ) is required, a single sensing signal producing device may be utilized for the intermittent and periodic sensing and correction of the individual distortions or, alternatively, a number of devices may be provided in order to maintain a continuous cross-talk monitoring or compensating operation, as will become further apparent as the description proceeds.

Expressed in other words, according to the present invention, the individual pulses of a first pulse train or series $[E_n]$ control the polarity reversal of a second pulse train or series $[E_{n+k}]$ which may be displaced by say $k$ steps and backward with respect to $[E_n]$, said polarity reversal being effected by the intermodulation device described in the foregoing. Since the amplitude of the main pulses is always greater than that of the superimposed distorting components, the sign of each individual pulse, from which distortion has been previously removed in the series $[E_n]$ by means of a suitable distortion compensator, corresponds to the sign of the corresponding transmitted pulses $[A_n]$. A constant or unity pulse $[A_n°]$ with the sign +1 or −1 may be formed by amplitude limiting of either $[E_n]$ or $[E_{n+k}]$, as will be described in greater detail in the following.

The unity or control pulses effect the polarity reversal of the series $[E_{n+k}]$ being time-displaced by $k$ steps, and since the pulses of the original train or series $[A_n]$ ordinarily do not exhibit any mutual correlation, mathematical analysis and calculation leads to a final monitoring or sensing signal at the output of the modulator equal to $v_k'=K°h_k$, which means that the output $k_k'$ of the modulator or polarity reversing device is a measure of the cross-talk factor or distortion both as to sense and magnitude.

Figure 1:
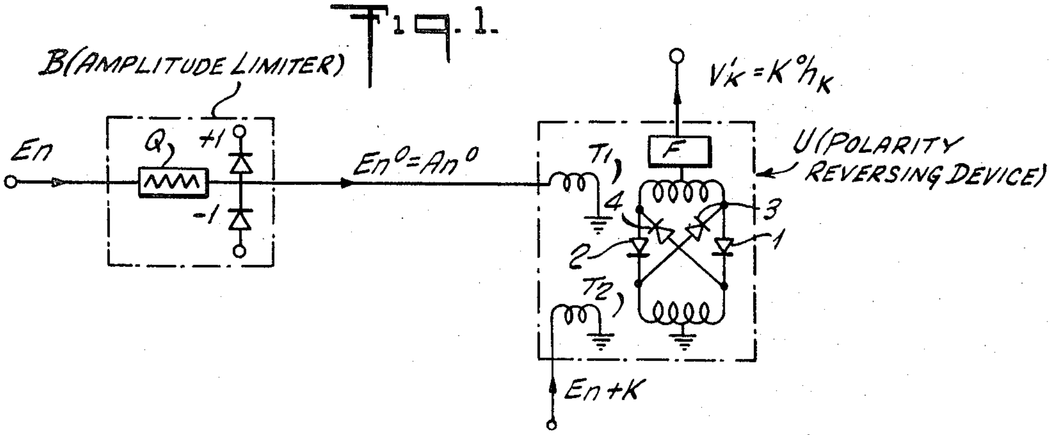
FIG. 1 is a block diagram showing the polarity-reversing cross-talk monitoring device of the invention.

Referring now more particularly to the drawings, FIG. 1, showing the cross-distortion sensing or monitoring signal generator of the invention, the pulse train $[E_n]$ supplied by a preceding distortion compensator as shown, for instance, by the co-pending application, is fed to an amplitude limiter B which supplies control pulse train $[E_n°]$ preferably comprised of unity pulses having amplitudes of +1 or −1, the sign corresponding in each case to the sign of the original pulses $[A_n]$. According to this sign, the pulses of the further (delayed) signals $[E_{n+k}]$ have their polarity reversed in the reversing device or modulator U. There thus results therefrom, if necessary, after adequate smoothing in a filter F forming part of U, an output signal $v_k'$ proportional, both as to sign and magnitude, to the respective cross-talk value $h_k$, in the manner described hereinbefore.

With further reference to FIG. 1 the amplitude limiter reducing the pulses $E_n$ to a constant or unity amplitude may comprise, in the example shown, a pair of rectifiers or diodes biased by +1 and −1 volt and a series resistance Q. Due to the shunting of the currents by said rectifiers, output voltages +1 volt cannot be exceeded, whereby to result in the unity control pulses $[E_n°]$ or $[A_n°]$, respectively. The polarity reversing device or modulator U takes the form, in the example shown, of a known so-called ring modulator comprising a bridge of four rectifiers 1, 2, 3, 4 and a pair of input transformers $T_1$ and $T_2$ for the feeding of the signals $[A_n°]$ and $[E_{n+k}]$, respectively, the output signal $v_k'$ being derived from the center points of the transformer secondary windings by way of the smoothing filter F. As a consequence, if the control pulse $[E_n°]$ is positive, rectifiers 1 and 4 become conducting, whereby to cause the pulses $[E_{n+k}]$ to act in one sense upon the output voltage $v_k'$. On the other hand, if $[A_n°]$ is negative, rectifiers 2 and 3 become conducting and the pulses $[E_{n+k}]$ act with opposite sense upon the output signal $v_k'$. In other words, the modulator U acts in the manner of a polarity-reversing device by controlling the output polarity according to the sign of $[E_n°]$ or $[A_n°]$. Furthermore, since the pulses $[E_n°]$ and $[E_{n+k}]$ are applied to the modulator U via the transformers $T_1$ and $T_2$, the direct current component of the output signal $v_k'$ is suppressed, whereby the latter represents the residual cross-talk fluctuations only if $[E_n]$ is supplied by the output of a preceding cross-talk compensator, as shown among others in FIGS. 3 and 3*a*. In other words, after the cross-talk compensator has been adjusted for optimum or zero cross-talk compensation by control of the correcting devices $P_1, P_2, P_{-1}, P_{-2}$, FIGS. 3 and 3*a*, the output signal $v_k'$ will be zero and varies in either direction in proportion to any residual positive or negative cross-talk contained in the signals $[E_n]$ leaving the output of the compensating device.

Figures 2, 3:
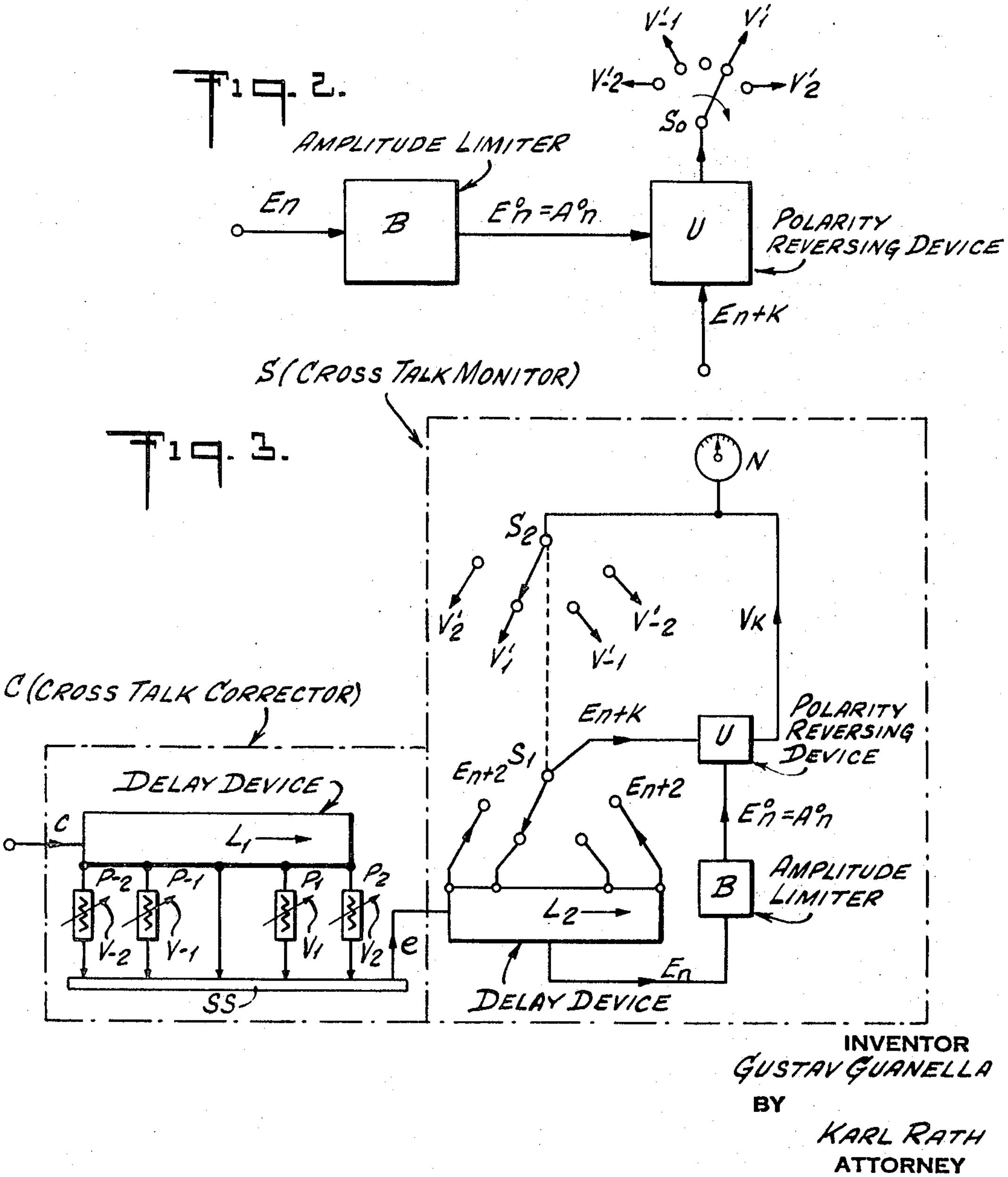
FIG. 2 is a block diagram similar to FIG. 1, embodying a change-over switch or distributor for use in conjunction with a plurality of distortion sensing or monitoring signals.
FIG. 3 is a block diagram of a monitoring device according to FIG. 2 combined with a conventional leading trailing pulse distortion compensator.

Referring to FIG. 2, a polarity reversing device or modulator U is utilized in conjunction with a change-over switch $S_o$ which serves to obtain a plurality of cross-talk sensing or monitoring signals $v'_{-2}$, $v'_{-1}$, $v'_1$ and $v'_2$. The position of the change-over switch then corresponds to the particular time displacement $k$ between the two pulse trains $[E_n]$ and $[E_{n+k}]$ the mutual cross-talk factor of which is to be determined.

FIG. 3 shows the combination of a cross-talk compensator C with a residual cross-talk sensing or monitoring device S according to the invention, to effect an automatic cross-talk control or compensation, substantially independently of variations or fluctuations of the cross-talk producing factors or characteristics of the transmission line or channel. In this figure, the cross-talk compensator of known design comprises a delay device $L_1$ and adjustable correcting elements $P_{-2}$ . . . $P_2$ for the setting of the cross-talk compensating signals or voltages $v_1$, $v_2$, $v_{-1}$, and $v_{-2}$, in the manner more clearly described and explained in the co-pending application. In order to monitor the residual cross-talk values still present, or occurring subsequent to the setting or adjustment, in the signal *e* supplied by the output of the compensator C, a component of signal *e* is fed to a further delay device $L_2$ of the cross-talk monitoring device S, the output pulse trains $[E_n]$ and $[E_{n+k}]$ of said delay device exhibiting a mutual shift of *k* steps. As a consequence, the polarity-reversing method described in reference to FIG. 1 results in the generation of the monitoring signals $v'_{-2} \ldots v'_2$ being representative of the respective residual cross-talk values or factors in the manner pointed out. The signals $v'_k$ may be monitored with the aid of an indicator instrument N, or may serve directly for the automatic setting or control of the correcting elements $P_{-2} \ldots P_2$, as described in the following.

FIG. 3*a* shows a complete automatic cross-talk compensating system according to the invention comprising separate delay devices $L_1$ and $L_2$ for the main iompensator C and cross-talk monitoring device S, respectively. The devices $L_1$ and $L_2$ may be in the form of tapped artificial delay lines, as shown in FIG. 11*b*, or in the form of capacitor charge transfer switching devices, as shown in FIG. 11*a* of the above-mentioned patent, the latter arrangement being especially suitable for the utilization of instantaneous pulse amplitudes ($E_n^\circ$, $E_{n+k}$) which have been found sufficient for effecting cross-talk compensation in pulse signal transmission, as pointed out hereinabove.

More specifically, in FIG. 3*a* the signals *c* received at a receiving point result, after passing through the cross-talk compensator C, in the output signals *e* free from cross-talk distortion by the effect of the cross-talk compensating signals $v_{-2}$, $v_{-1}$, $v_2$ and $v_1$, in the manner described in greater detail in the co-pending application. A component of the signals *e* is furthermore applied to the cross-talk monitoring device S comprising separate modulators U one for each cross-talk component and controlled by common unity signals $[E_n^\circ]$ produced by means of a single limiter B, to result in the cross-talk sensing or monitoring signals $v'_{-2}$, $v'_{-1}$, $v'_1$, $v'_2$ which serve for the control of the respective correcting devices $P_{-1}$, $P_{-2}$, $P_2$, $P_1$ of the compensator C, to automatically compensate for any residual cross-talk or fluctuations of the signals *e* after presetting of the devices $P_{-2} \ldots P_2$.

Referring more particularly to FIG. 3*b*, there is shown, by way of example, a suitable correcting device $P_k$, to take the place of the devices $P_{-2}$, $P_{-1}$, $P_1$, $P_2$ of FIG. 3*a*, for the compensation of both positive and negative cross-talk controlled by the sensing signals $v_k'$ of corresponding sense or direction. The various stages of the delay device $L_1$ of the compensator are provided with symmetrical outputs derived, as shown for instance in FIG. 3*a*, from the respective correcting elements $P_{-2} \ldots P_2$. In the example shown, the correcting device $P_k$ includes a pair of thermistors $Q_1$ and $Q_2$ having their temperature controlled by heating resistors $H_1$ and $H_2$, respectively, connected in series to a suitable direct current source as indicated by the plus and minus signs in the drawing. With the thermistors $Q_1$ and $Q_2$ and heaters $H_1$ and $H_2$ connected, in the manner shown, with the delay device $L_1$, on the one hand, and the summation circuit or lead SS, on the other hand, the heating currents through $H_1$ and $H_2$ are alike if no cross-talk signal $v_k'$ is applied to the junction point of said resistors, that is, with no residual cross-talk being contained in the output pulses *e*. Since under this condition the resistances of $Q_1$ and $Q_2$ are alike, the output voltage or signal $v_k$ applied to SS will be zero. On the other hand, if $v'_k$ is positive (positive cross-talk) the current through $H_2$ increases while at the same time the current through $H_1$ is decreased. As a consequence, the resistance of $Q_2$ decreases and the resistance of $Q_1$ increases, whereby to apply a positive signal $v_k=+e_k$ to SS, and vice versa if $v'_k$ becomes negative (negative cross-talk), in which case $v_k=-e_k$. In general, $v_k=v_k' \cdot e_k$. The positive and negative voltages $+e_k$ and $-e_k$ may be derived from $L_1$ through suitable inverting or phase reversing devices.

In place of the temperature-dependent resistors $Q_1$ and $Q_2$ of FIG. 3*b*, light-dependent (photo) resistors, electromagnetically controlled resistors, or the like may be used for the purposes of the invention to effect both positive and negative cross-talk correction in accordance with the invention.

The device according to FIG. 4 comprises two delay devices $L_1$ and $L_2$ for correcting leading and trailing distortion. The delay device $L_2$, whereof the input corresponds to the signal *e*, also serves to obtain the output pulse train $[E_n]$ and $[E_{n+k}]$. From the train $[E_n]$ there is formed, by limiting in B, the unity pulse train $[A_n^\circ]$ whereof the individual pulses have the same sign as the original pulses $[A_n]$. The sensing or monitoring signals $v'_{-2} \ldots v'_2$ for the control of the correcting $P_{-2} \ldots P_2$ are again obtained by the method shown in FIG. 1 by the action of the polarity-reversers U. As can be seen, in FIG. 4 the delay device $L_1$ is utilized to compensate for the trailing distortion, while the device $L_2$ is combinedly used for the compensation of the leading distortion and as a component of the cross-talk monitoring device.

In FIG. 5, again separate delay devices $L_1$, $L_2$ for compensating for leading and trailing distortion, respectively, are provided. If the distortion involved in the transmission is not too great, it may be assumed that the recevied distorted pulses $[C_n]$ have the same sign as the corresponding original pulses $[A_n]$. In this case, the unity pulses $[A^\circ_{n+1}]$ and $[A^\circ_{n-1}]$ can be obtained by limiting the pulses $[A^\circ_{n+2}]$ in the amplitude limiters B. The unity pulses $[A^\circ_{n+2}]$ may also be formed in the same way. The monitoring or sensing signal voltages $v'_{+2} \ldots v'_{-2}$ are then produced by reversing the polarity of the pulse train $[E_n]$ by the pulse trains $[A^\circ_{n-2}] \ldots A^\circ_{n+2}$. In other words, in FIG. 5, the unity or control pulses are formed from the delayed pulses and the pulses $E_n$ are directly applied to the modulators U, to obtain the same result in the form of monitoring or sensing signals $v_k'$ as in delaying the main signals, as described in the foregoing.

Separate delay devices $L_1$, $L_2$ for removing the distortion from the pulses and automatically controlling the residual cross-talk are also provided in the device according to FIG. 6, constructed in the manner proposed by the co-pending application. In such an arrangement, a common delay device $L_1$ serves to compensate for both leading and trailing distortion, in the manner described in the co-pending application, while the second delay device $L_2$ serves to obtain the pulses train $[E_{n-2}]$ and the control pulses trains $[A^\circ_{n-1}]$ and $[A^\circ_{n-2}]$. The limiters $B_{-2} \ldots B_2$ are provided for the purpose of forming the control pulse trains in the manner understood from the foregoing. The monitoring or sensing signals $v_k'$ are again produced from the shifted pulse trains $[E_{n-k}]$ by the action of the modulators or polarity reversers $U_{-2} \ldots U_2$.

The arrangement shown in the right-hand part of FIG. 6 may be replaced by an arrangement corresponding to FIG. 6*a*, in which case the expenditure of parts will be somewhat less because only one limiter is required for the production of the control pulse train $[A_n^\circ]$ or $[A^\circ_{n-2}]$ respectively. In this case also, the sensing signals $v_k'$ are produced by the polarity reversal of a first pulse train controlling a second time-displaced pulse train.

It should be observed that alternative or equivalent means may be used in place of the amplitude limiters B, to obtain unity or control pulses of corresponding sign, for example suitably controlled sweep circuits. Electronic polarity-reversing devices or circuits may also be used in which the polarity of an input voltage is reversed in dependance upon the amplitude of the control pulses. In such a case, the limiters B may be dispensed with. Experience has shown that the output amplitude may also be allowed to depend to a certain extent on the amplitude of the control signals, but should not rise in proportion to the control voltage as in the case of certain product-forming circuits or correlating devices.

The monitoring or sensing device according to FIGS. 6*b* and 6*c* operates in the same manner as shown in FIGS. 6 and 6*a*, with the exception that only one delay device $L_o$ is used which serves both as a part of the distortion compensator, to remove distortion from the incoming pulses, and as delay means for the formation of the monitoring (sensing) signals in the manner according to the present invention. In this connection, it is assumed that the signals at the input to the delay device are first freed from the trailing distortion and that the leading distortion of the pulse train $[D_{n+1}]$ is still present. Since the individual pulses in this train have the same sign as the pulses from which distortion has been removed, the polarity-reversing pulse train $[A^{\circ}_{n+2}]$ may be obtained by limiting the pulse train $[D_{n+1}]$. The pulse train $[A^{\circ}_{n+1}]$ is produced in the same way from $[D_{n+1}]$. These pulse trains are displaced in time by one or two steps with respect to the corrected pulse train $[E_n]$ so that the monitoring or sensing signals are again obtained from the polarity-reversing process. The leading distortion still contained in the pulse train $[D_{n+2}]$ has no effect on the monitoring signal $v'_2$ obtained by the polarity-reversing process, said signal depending exclusively on the trailing distortion. This is readily apparent if regard is had to the fact that the leading distortion obtained in $[D_{n+2}]$ represents pulse trains which exhibit no correlation whatever with respect to the original pulse train $[A_n]$ or to the corresponding control pulse train $[A_n{}^{\circ}]$.

The cross-talk monitoring process according to the invention may also be used in order to monitor or correct the cross-talk between two or more orignially independent pulse trains, for example, as obtained in a transmission system having a plurality of pulse channels exhibiting mutual coupling between adjacent channels. The process for removing distortion due to mutual coupling from a pulse train at the receiving end of a transmission channel is described in greater detail in the aforementioned copending application in reference to FIGS. 7 to 10 thereof.

According to FIG. 7, an arrangement of this type comprising additional delay devices $L_2'$ and $L_2''$ may be used for monitoring or sensing the signals *e'* and *e''*, from which cross-channel distortion has been previously removed by means of suitable distortion compensators, as to residual mutual coupling distortion of said signals. According to arrangement shown, a monitoring signal $v_2'$ is produced by reversing the polarity of the first pulse train $[E_n']$ to correspond to the associated control pulse train $[A^{\circ 1}_{n-2}]$ being delayed by two steps and which is produced, by limiting in $B_{+o}'$, by the first pulse train being delayed by two steps. In contrast, cross-talk from the first pulse train, delayed by two steps, on the second pulse train $E_n''$ is monitored by reversing the polarity of the second pulse train by a control pulse train $A^{\circ 1}_{n-2}$ which is obtained, by limiting in $B_{+o}'$ from the first pulse train delayed by two steps. The reversal of polarity takes place in the polarity reverser or modulator $U_5''$ and results in the monitoring signal $w_2''$.

The delay devices required for compensation and monitoring purposes analogous to those of FIGS. 4, 5, 6*b* and 6*c* may also be combined in the case of an arrangement for compensating for cross-coupling between two separate pulse transmission channels. The delay devices $L_o'$ and $L_o''$ shown in FIG. 8 correspond to the delay devices of a compensating system or circuit. The additional devices which serve to generate the monitoring voltages *v* and *w*, whereof *v'* and *v''* denote the cross-talk values within the first and second transmission channels, respectively, while *w'* and *w''* denote the cross-talk from the second on the first channel and from the first on the second channel, respectively. In this case too, pulse trains $D_n$ are controlled not yet freed from leading distortion analogously to the arrangement according to FIGS. 6*b* and 6*c*.

In the case of transmission channels which suppress the lower frequency components and, more particularly, also the direct current component of the signals, special means are required to restore these components, because the ordinary distortion compensators are not suited to recover the suppressed components. Thus, according to FIG. 9 the normal distortion compensator IE for removing distortion from the incoming pulses at the receiving end of a transmission channel is supplemented by an additional device UK in the form of a direct current and/or low-frequency restorer. There may be utilized, for this purpose interposed pauses or pulses being of constant amplitude and interspaced in the signal pulse train, the correcting signals being so designated as to restore the original signal values by the interposed signal elements. The device KV for the generation of the cross-talk monitoring signals is in this case connected to the output of the low-frequency restorer UK. The monitoring signals $v_k'$ may again serve for automatically correcting the correcting elements of the compensator IE, in the manner described hereinbefore. Low-frequency correction of the cross-talk compensated signals in the device UK then results in the final output signal which again corresponds to the transmitted signal including the low-frequency signal components.

It is also possible to monitor cross-talk without previously restoring the suppressed low frequencies. In this case, regard must be had to the fact that the missing low frequencies may cause a mutual correlation between neighboring received pulses, or between received pulses disspaced by definite intervals. This correlation has a disturbing effect on the polarity-reversing process producing the cross-talk monitoring signals. However, the disturbing effect can be avoided by the use of an arrangement according to FIG. 10. According to the latter, the modulators or polarity reversers U, besides being fed by the input signals $E_n$, are additionally fed by amounts, capable of adjustment by means of potentiometers R, of the delayed signals $E_{n-1}$, $E_{n-2}$ and $C_{n+1}$, $C_{n+2}$. Similarly to the process explained in reference to FIG. 5, the monitoring magnitudes $v_k$ obtained by the polarity-reversal first of all contain a component $r_k \cdot v_{k1}$, where $r_k$ designates the attenuation of the signals $E_n$ by the potentiometers R. The additional index 1 in $V_{k1}$ signifies that the cross-talk value $v_{k1}$ is disturbed due to the absence of the low frequency components. A further component $(1-r_kQ \cdot v_{o1}$ arises from the input signal of the limiter fed via the potentiometer R to the polarity reverser U. In this connection, the attenuation by the potentiometer is expressed by $(1-r_k)$, while $v_{o1}$ corresponds to the always positive amount of a magnitude which arises as a result of the self-controlled polarity reversal of input magnitude of the limiters.

In the case of the polarity-reversing process according to the invention for the generation of cross-talk monitoring or sensing signals, it has been presupposed that the sign of the pulses which control the polaritay reversal corresponds to the sign of the corresponding transmitted pulses. However, if individual pulses in the transmitted signal are of relatively low amplitude, the foregoing condition may not always be fulfilled. For this reason, it is advisable to avoid the transmission of pulses whereof the amplitude does not have a certain minimum value by increasing the amplitudes of the original transmitted pulses $Z_n$ b ya constant amount $Z_n{}^{\circ}$ at the transmitting end, in the manner as shown in FIG. 11. The sign of the increments should correspond to the sign at any particular instant of the pulses $E_n$. This additional value may be obtained by amplifying and limiting the pulse train $Z_n$, or any equivalent device or circuit. After compensation at the receiving end in IK, the additional signals $Z_n{}^{\circ}$ must be removed by subtraction from the main signals, to ensure that the original transmitted pulse train $Z_n$ is transmitted with the correct sign, even if the individual pulses are of relatively low amplitude.

In the case of the polarity-reversing process as described herein, the output magnitude ($v_k'$) of the polarity-reversers U must be sufficiently smoothed, since only the average value of the magnitude formed over a fairly long period corresponds to the cross-talk to be monitored, while the instantaneous values of the signals produced as a result of the polarity reversal depend also on the useful pulses appearing at the same instants. In order to enable monitoring to be carried out relatively rapidly and instantly, it is advisable to provide for a temporary transmission of special or separate control pulses whereof the sign changes periodically or statistically, and which are separated by intervals greater than the width of the distorted or lengthened pulses resulting from the distortion. The monitoring magnitude $v$ obtained in this way then depends only on the pulse cross-talk value as such and may be directly used without long-period smoothing or filtering for the automatic correction of the distortion, in the manner described hereinbefore.

In an arrangement of the foregoing type, it is possible to dispense with any delay device altogether for the generation of the monitoring signals, it being sufficient, for instance, to use a device as shown by FIG. 12, wherein a polarity reverser U is controlled by the transmitted special control pulses $E_0$. Additional means must, however, be provided in an arrangement of this type, to ensure that the control continues for the whole duration of the received signals associated with the pulses $E_0$. The instantaneous values $E_k$ of the corrected received signal $e$ which may have its polarity reversed, to correspond to the sign of the pulses $E_0$, are fed, by way of the polarity reverser U, to a change-over switch $S_0$ the position of which at any instant corresponds to the time interval between $E_k$ and $E_0$. The monitoring magnitudes $v'_{-2} \ldots v'_2$ produced by smoothing the individual values $v_k''$ thus generated are then directly proportional to the cross-talk values to be determined. It should be noted that, as opposed to known arrangements, use is here made of the changing signs of the transmitted control pulses ($E_0$), whereby to avoid the disturbing effects of direct current distortion occurring during transmission, as well as to reduce transmission noise.

FIG. 13 shows another correcting device $P_k$ in the form of a bridge circuit including a differential transformer T and a number of resistors $R_0$, $R_1$, $R_2$. As correcting elements the values of the latter are graduated according to binary notation and are selectively connected in the path of the compensating signal $D_{n+k}$ by the pulses stored in a binary counter Z, the stored pulses of the counter corresponding to the monitoring signals $v_k'$ in binary coding derived from the polarity reverser U. They may be obtained by means of an oscillator G producing an output magnitude $s$ of frequency proportional to the absolute value of the magnitude $v_k'$ produced in a rectifier R. The control voltage $v_{1,2}$ obtained from the limiter B serves to control the changeover switch S′, whereby the input signals $s_1$ and $s_2$ are fed to the counter Z in accordance with the sign of $v_k'$ for the purpose of effecting forward and backward counting, respectively.

According to a modified embodiment of the invention, the signals from which distortion is to be removed may first of all be converted to a pulse sequence by binary coding by means of a suitable analog-digital conversion device. In this case, suitably controlled pulse storage devices must be used in place of the delay devices described hereinbefore. The controllable correcting devices $P_k$ may be replaced by circuits forming the product of the coded signals and the likewise coded control magnitudes $v_k$ in accordance with the rules of digital arithmetic. The values thus formed must then also be combined in accordance with digital algebra and, in order to obtain the coded control magnitudes $v_k$, the coded signal values must be multiplied by the two-stage quantized signal values shifted by $k$ steps.

Any undesired autocorrelation of the transmitted pulse train signals $A_n$ which may obtain may furthermore be avoided by the provision of program-controlled converters.

There is thus provided by the invention, in accordance with the examples described, an automatic cross-talk compensating system utilizing separate or common delay devices for the correction of both the trailing and leading distortion, as well as separate or common delay devices for the production of the cross-talk monitoring signals representative of both leading and trailing distortion, respectively, and finally systems utilizing delay devices common to both the cross-talk compensating and monitoring devices. Besides, the control voltages for controlling a number of polarity reversers U may be in common for all said reversers, and the monitoring device may be used for simple cross-talk or supervision or indication.

In the foregoing the invention has been described in reference to a few illustrative devices or systems. It will be evident, however, that variations and modifications, as well as the substitution of equivalent devices or elements for those shown and described herein for illustration, may be made in accordance with the broader purview and spirit of the invention as set forth in the appended claims. The specification and drawings are accordingly to be regarded in an illustrative rather than in a restrictive sense.

I claim:

1. In a system for electrical signal transmission by means of a series of equi-spaced signal pulses subject to cross-distortion during transmission by one pulse imposing cross-distortion components upon at least two other pulses displaced respectively from said first pulse by leading and lagging cross-distortion intervals equal to predetermined, including unity, multiples of the pulse spacing interval of said system, a cross-distortion monitor comprising in combination:

(1) first circuit means to derive a series of first signal pulses, (2) a pair of second circuit means to derive a pair of series of second signal pulses leading and lagging respectively said first pulses by intervals equal to said cross-distortion intervals, (3) a pair of intermodulation means to combine each of said series of second pulses with said series of first pulses, (4) amplitude limiting means to reduce one of the pulse series combined by each of said intermodulation means to a predetermined constant amplitude, and (5) means including low-pass filter means connected to the output of each of said intermodulation means, to derive a pair of intermodulation signal components proportional respectively in sense and magnitude to said leading and lagging cross-distortion components.

2. In a distortion monitor as claimed in claim 1, wherein said intermodulation means is comprised of a pair of modulators and said limiting means is comprised of a common amplitude limiter having its input connected to said first circuit means and having its output connected to both of said modulators.

3. In a distortion monitor as claimed in claim 1, wherein said intermodulation means is comprised of a pair of modulators and said limiting means is comprised of a pair of amplitude limiters having their inputs connected each to one of said second circuit means and having their outputs connected each to one of said modulators.

4. In a distortion monitor as claimed in claim 1, wherein said intermodulation means is comprised of a common modulator having input circuits and a pair of output circuits, and synchronous periodic switching means to successively and periodically connect said second circuit means and said output circuits to said modulator.

5. A cross-distortion monitor as claimed in claim 1, wherein said first and second circuit means include a time delay device having its input connected to said transmission system and having a plurality of a tap points mutually spaced by intervals, to derive said first, second and third pulse series.

6. A cross distortion monitor as claimed in claim 1, wherein said first and second circuit means include a time delay device having a plurality of tap points mutually spaced by distances, to derive said first, second and third pulse series, additional tap points of said device spaced from each other and said first tap points by distances corresponding to the pulse spacing interval of said system, and further means to intermodulate the auxiliary pulse series derived from said additional tap points with said first pulse series, to produce additional control signals proportional to the respective cross-distortion components.

7. A cross-distortion monitor as claimed in claim 1, wherein said first and second circuit include a time delay device having its input connected to said transmission system and having a plurality of tap points mutually spaced by distances, to derive said first, second and third pulse series, additional tap points upon said device arranged and spaced like said first tap points, means to intermodulate the auxiliary pulse series, derived from said additional tap points with said first pulse series to produce additional control signals proportional to the respective cross-distortion components, said intermodulation means being comprised of a common modulator, a plurality of translating circuits and synchronous periodic switching means to successively a nd periodically connect corresponding tap points of said device and said translating circuits to the input and output respectively of said modulator.

8. A cross-distortion monitor as claimed in claim 1, wherein said first pulse series and said second and third auxiliary pulse series are derived from the same signal series of said system.

9. A cross-distortion monitor as claimed in claim 1, wherein said first pulse series, on the one hand, and said second and third auxiliary pulse series, on the other hand, are derived from different signal pulse series of said system subject to mutual cross-talk there-between.

10. A cross distortion monitor as claimed in claim 1, wherein said pulse series are applied to said intermodulation means by way of reactive coupling devices to eliminate the D.C. component in the respective control signals of said intermodulation means.

11. A cross-distortion as claimed in claim 1, wherein said intermodulation means is comprised of rectifier-type ring modulators having a pair of inductive inputs for applying thereto the respective pulse series.

12. A cross-distortion monitor as claimed in claim 1, wherein said amplitude-limiting means comprises a series resistance shunted by first and second rectifiers arranged in opposed polarity relation and a pair of fixed biasing potential sources each in series with and negatively biasing one of said rectifiers.

13. In electric signaling by means of a series of equispaced signal pulses subject to cross-distortion during transmission by one pulse imposing cross-distortion components upon at least two other pulses displaced respectively from said first pulse by leading and lagging cross-distortion intervals equal to predetermined, including unity, multiples of the pulse spacing interval, an automatic cross-distortion compensating system comprising in combination:

(1) a pulse distortion compensator comprising
  (a) first circuit means to derive a first signal pulse series,
  (b) a pair of second circuit means to derive a pair of second signal pulse series leading and lagging respectively said first pulse series by intervals equal to said cross-distortion intervals, and
  (c) summation means including a pair of voltage-dependent attenuators, to combine each of said second pulse series in proper amplitude and polarity relation with said first pulse series, to produce compensated pulse signals substantially free of said cross-distortion components,
(2) a cross-distortion monitor comprising
  (a) first circuit means to derive a series of first compensated signal pulses,
  (b) a pair of second circuit means to derive a pair of series of second compensated signal pulses leading and lagging respectively said first compensated pulses by intervals equal to said cross-distortion intervals,
  (c) intermodulation means to combine each of said series of second compensated pulses with said first compensated pulses,
  (d) means to reduce the amplitude of one of the pulses combined by each of said intermodulation means to a predetermined constant value, and
  (e) means including low-pass filter means connected to the output of each of said intermodulation means, to derive a pair of intermodulation control signals proportional respectively, in sense and magnitude, to the residual leading and lagging distortion components of said compensated pulse signals and
(3) means to apply said control signals to the respective attenuators of said compensator, to maintain an automatic distortion compensation substantially independently of fluctuations of said cross-distortion components.

14. In a system for electric signal transmission by means of a series of equi-spaced pulses subject to cross-distortion during transmission by the amplitude of one imposing cross-distortion components upon at least two further pulses displaced respectively from said first pulse by leading and lagging distortion intervals equal to predetermined, including unity, multiples of the pulse spacing interval of said system, a cross-distortion monitor comprising in combination:

(1) first circuit means including amplitude limiting means to derive a first pulse series from said system having a constant amplitude,
(2) a pair of second circuit means to derive second and third auxiliary pulse series from said system leading and lagging respectively said first pulse series by intervals equal to said cross-distortion intervals, and
(3) a pair of intermodulation means including a low-pass filter means to combine said first pulse series with each of said second and third auxiliary pulse series,
(4) to produce a pair of output control signals in the resultant intermodulation products proportional respectively to said leading and lagging cross-distortion components.

15. In electric signaling by means of a series of equidistant signal pulses subject to cross-distortion during transmission by one pulse imposing cross-distortion components upon at least two further pulses displaced respectively from said first pulse by leading and lagging cross-distortion intervals equal to predetermined, including unity, multiples of the pulse spacing interval, an automatic cross-distortion compensating system comprising in combination:

(1) a distortion compensator including
  (a) first circuit means to derive a first pulse series,
  (b) a pair of second circuit means to derive second and third auxiliary pulse series leading and lagging respectively said pulse series by intervals equal to said cross distortion intervals, and (c) summation means including a pair of voltage-dependent attenuators, to combine said second and third auxiliary pulse series in proper amplitude and polarity relation with said first pulse series, to produce compensated pulse signals substantially free of said distortion components, (2) a cross-distortion monitor including (a) first circuit means connected to said compensator and including amplitude limiting means, to derive a first compensated pulse series having a predetermined constant amplitude, (b) a pair of second circuit means connected to said compensator to derive second and third compensated pulse series leading and lagging respectively said first pulse series by interval equal to said cross-distortion intervals, and a pair of intermodulation means to combine said first compensated pulse series with each of said second and third compensated pulse series, to produce a pair of output control signals in the resultant intermodulation products proportional respectively to the residual leading and lagging distortion components of said compensated pulse signals, and (3) means to apply said control signals to the respective attenuators of said compensator, to maintain an automatic distortion compensation substantially independently of fluctuations of said distortion components.

References Cited

UNITED STATES PATENTS

| | | | |
|---|---|---|---|
| 2,607,035 | 8/1952 | Levine | 179—15 |
| 2,927,166 | 3/1960 | Shirman | 179—15 |
| 3,038,155 | 6/1962 | Parquier et al. | 325—42 |
| 3,206,688 | 9/1965 | Di Toro | 325—323 |
| 3,292,110 | 12/1966 | Becker et al. | 178—69 |

FOREIGN PATENTS

| | | |
|---|---|---|
| 1,165,103 | 3/1964 | Germany. |

RALPH D. BLAKESLEE, Primary Examiner

U.S. Cl. X.R.

325—65, 323; 179—15